(12) United States Patent
Ito et al.

(10) Patent No.: US 10,878,832 B2
(45) Date of Patent: Dec. 29, 2020

(54) MASK ESTIMATION APPARATUS, MASK ESTIMATION METHOD, AND MASK ESTIMATION PROGRAM

(71) Applicant: NIPPON TELEGRAPH AND TELEPHONE CORPORATION, Chiyoda-ku (JP)

(72) Inventors: Nobutaka Ito, Soraku-gun (JP); Shoko Araki, Soraku-gun (JP); Tomohiro Nakatani, Soraku-gun (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 197 days.

(21) Appl. No.: 15/998,742

(22) PCT Filed: Dec. 20, 2016

(86) PCT No.: PCT/JP2016/087996
§ 371 (c)(1),
(2) Date: Aug. 16, 2018

(87) PCT Pub. No.: WO2017/141542
PCT Pub. Date: Aug. 24, 2017

(65) Prior Publication Data
US 2019/0267019 A1    Aug. 29, 2019

(30) Foreign Application Priority Data
Feb. 16, 2016 (JP) .................... 2016-027424

(51) Int. Cl.
*G10L 21/028* (2013.01)
*G06K 9/62* (2006.01)
(Continued)

(52) U.S. Cl.
CPC ............ *G10L 21/028* (2013.01); *G06K 9/624* (2013.01); *G10L 21/0272* (2013.01); *G10L 21/0308* (2013.01)

(58) Field of Classification Search
CPC ..................................................... G10L 21/028
See application file for complete search history.

(56) References Cited

U.S. PATENT DOCUMENTS 6,816,632 B1 *  11/2004  Slice ................. G06K 9/00342
                                                       382/291
2006/0034361 A1 *  2/2006  Choi .................... H04R 5/04
                                                       375/224
(Continued)

FOREIGN PATENT DOCUMENTS

JP    2006-337851 A    12/2006
JP    2012-163676 A    8/2012

OTHER PUBLICATIONS

International Search Report dated Mar. 14, 2017 in PCT/JP2016/087996 filed Dec. 20, 2016.
(Continued)

*Primary Examiner* — Jakieda R Jackson
(74) *Attorney, Agent, or Firm* — Oblon, McClelland, Maier & Neustadt, L.L.P.

(57) ABSTRACT

A feature extraction unit in a mask estimation apparatus extracts, from a plurality of observation signals obtained by observing a plurality of acoustic signals at different positions, feature vectors obtained by collecting time-frequency components of the observation signals for each time-frequency point. A mask update unit uses the feature vectors, a mixture weight of each component distribution, and a shape parameter that is a model parameter capable of controlling a shape of each component distribution, where a probability distribution of the feature vectors is modeled by a mixture distribution consisting of a plurality of component distribu-
(Continued)

tions, to estimate masks indicating a proportion in which each component distribution contributes to each time-frequency point. A mixture weight update unit updates the mixture weight based on the updated masks. A parameter update unit updates the shape parameter by using the feature vectors and the masks.

11 Claims, 6 Drawing Sheets

(51) Int. Cl.
*G10L 21/0308* (2013.01)
*G10L 21/0272* (2013.01)

(56) References Cited

U.S. PATENT DOCUMENTS

| | | | |
|---|---|---|---|
| 2006/0126714 A1* | 6/2006 | Lin | H04L 1/205 375/226 |
| 2006/0277035 A1 | 12/2006 | Hiroe et al. | |
| 2007/0025556 A1* | 2/2007 | Hiekata | H04S 1/007 381/17 |
| 2007/0133811 A1* | 6/2007 | Hashimoto | G10L 21/0272 381/22 |
| 2009/0242787 A1* | 10/2009 | Nakayamada | H01J 37/3174 250/396 R |
| 2010/0020204 A1* | 1/2010 | Fleischer | G02F 1/3511 348/241 |
| 2010/0125352 A1* | 5/2010 | Yamada | G10L 21/0272 700/94 |
| 2011/0149301 A1* | 6/2011 | Kim | G03F 7/7085 356/622 |
| 2013/0311142 A1* | 11/2013 | Wang | G01T 1/2985 702/193 |
| 2015/0124988 A1* | 5/2015 | Song | G10L 21/0272 381/71.4 |
| 2016/0005394 A1* | 1/2016 | Hiroe | G10L 15/04 704/248 |
| 2016/0216384 A1* | 7/2016 | Chen | G01T 1/24 |

OTHER PUBLICATIONS

Ito, N. et al., "Permutation-Free Clustering Method for Underdetermined Blind Source Separation Based on Source Location Information", The Institute of Electronics, Information and Communication Engineers (IEICE), vol. J97-A, No. 4, 2014, pp. 234-246 (with English translation).

Ito, N. et al., "Modeling Audio Directional Statistics Using a Complex Bingham Mixture Model for Blind Source Extraction from Diffuse Noise", ICASSP, 2016, pp. 465-468.

Souden, M. et al, "A Multichannel MMSE-Based Framework for Speech Source Separation and Noise Reduction", IEEE Transactions on Audio, Speech and Language Processing, vol. 21, No. 9, ., Sep. 2013, pp. 1913-1928.

Office Action dated Dec. 18, 2018 in Japanese Patent Application No. 2017-567967 (with English translation).

* cited by examiner

MASK ESTIMATION APPARATUS, MASK ESTIMATION METHOD, AND MASK ESTIMATION PROGRAM

FIELD

The present invention relates to a mask estimation apparatus, a mask estimation method, and a mask estimation program.

BACKGROUND

A technology to estimate masks indicating the degree of contribution of each acoustic signal at each time-frequency point is known, which are used to estimate desired sound from observation signals acquired by a plurality of microphones. The masks are used for noise reduction or source separation of the observation signals.

For example, a technology to estimate masks by clustering feature vectors indicating information as to from which direction each acoustic signal sound arrives at each time-frequency point with attention paid to the fact that the directions of arrival of acoustic signals are different from one another is known.

CITATION LIST

Non Patent Literature

Non Patent Literature 1: M. Souden, S. Araki, K. Kinoshita, T. Nakatani, and H. Sawada, "A Multichannel MMSE-Based Framework for Speech Source Separation and Noise Reduction," IEEE TRANSACTIONS ON AUDIO, SPEECH AND LANGUAGE PROCESSING, VOL. 21, NO. 9, SEPTEMBER 2013, pp. 1913-1928.

SUMMARY

Technical Problem

In the above-mentioned technology, however, a position parameter and a spread parameter of a mixture distribution modeling the feature vectors are updated to adjust the positions and the spread of component distributions of the mixture distribution. Thus, a component distribution merely represents a shape of distribution that is rotationally symmetric about some axis. The shape of distribution of the feature vectors is affected by various factors including the positions of microphones and transfer characteristics in an acoustic space, and is not always rotationally symmetric. For example, the shape of distribution of the feature vectors may be an elliptical shape of distribution. Thus, in the above-mentioned technology, the mixture distribution cannot sufficiently approximate to the distribution of feature vectors, and the problem is that the accuracy of mask estimation is not always high.

One example of an embodiment disclosed herein has been made in view of the above, and, for example, it is an object thereof to provide a mask estimation apparatus, a mask estimation method, and a mask estimation program for further improving the accuracy of mask estimation.

Solution to Problem

In one example of an embodiment of the present application, for example, a mask estimation apparatus extracts, from a plurality of observation signals acquired at different positions under a situation where a plurality of acoustic signals are mixed, feature vectors obtained by collecting time-frequency components of the observation signals for each time-frequency point. The mask estimation apparatus uses the feature vectors, a mixture weight of each component distribution, and a shape parameter that is a model parameter capable of controlling a shape of each component distribution to update masks indicating a proportion in which each component distribution contributes to each time-frequency point, where a probability distribution of the feature vectors is modeled by a mixture distribution consisting of a plurality of component distributions. The mask estimation apparatus updates the mixture weight based on the updated masks. The mask estimation apparatus updates the shape parameter based on the feature vectors and the masks.

Advantageous Effects of Invention

According to one example of an embodiment disclosed herein, for example, masks can be accurately estimated even when the distribution of the feature vectors is not rotationally symmetric.

DESCRIPTION OF EMBODIMENTS

Examples of embodiments related to the technology disclosed herein are described below with reference to the drawings. Note that the technology disclosed herein is not limited by the following embodiments. Furthermore, embodiments in the following may be combined as appropriate as far as these embodiments are compatible.

Note that, in the following description, the expression "^A" for "A" is equivalent to "the symbol with ^ above A". Furthermore, the expression "vector A" is used when "A" is a vector, the expression "matrix A" is used when "A" is a matrix, and the expression "set A" is used when "A" is a set.

BACKGROUND ART

Prior to the disclosure of the embodiments of the present application, the background art as the basis for the technology disclosed herein is described. The background art is disclosed in Literature 1 "M. Souden, S. Araki, K. Kinoshita, T. Nakatani, and H. Sawada, "A Multichannel MMSE-Based Framework for Speech Source Separation and Noise Reduction," IEEE TRANSACTIONS ON AUDIO, SPEECH AND LANGUAGE PROCESSING, VOL. 21, NO. 9, SEPTEMBER 2013, pp. 1913-1928."

Figure 6:
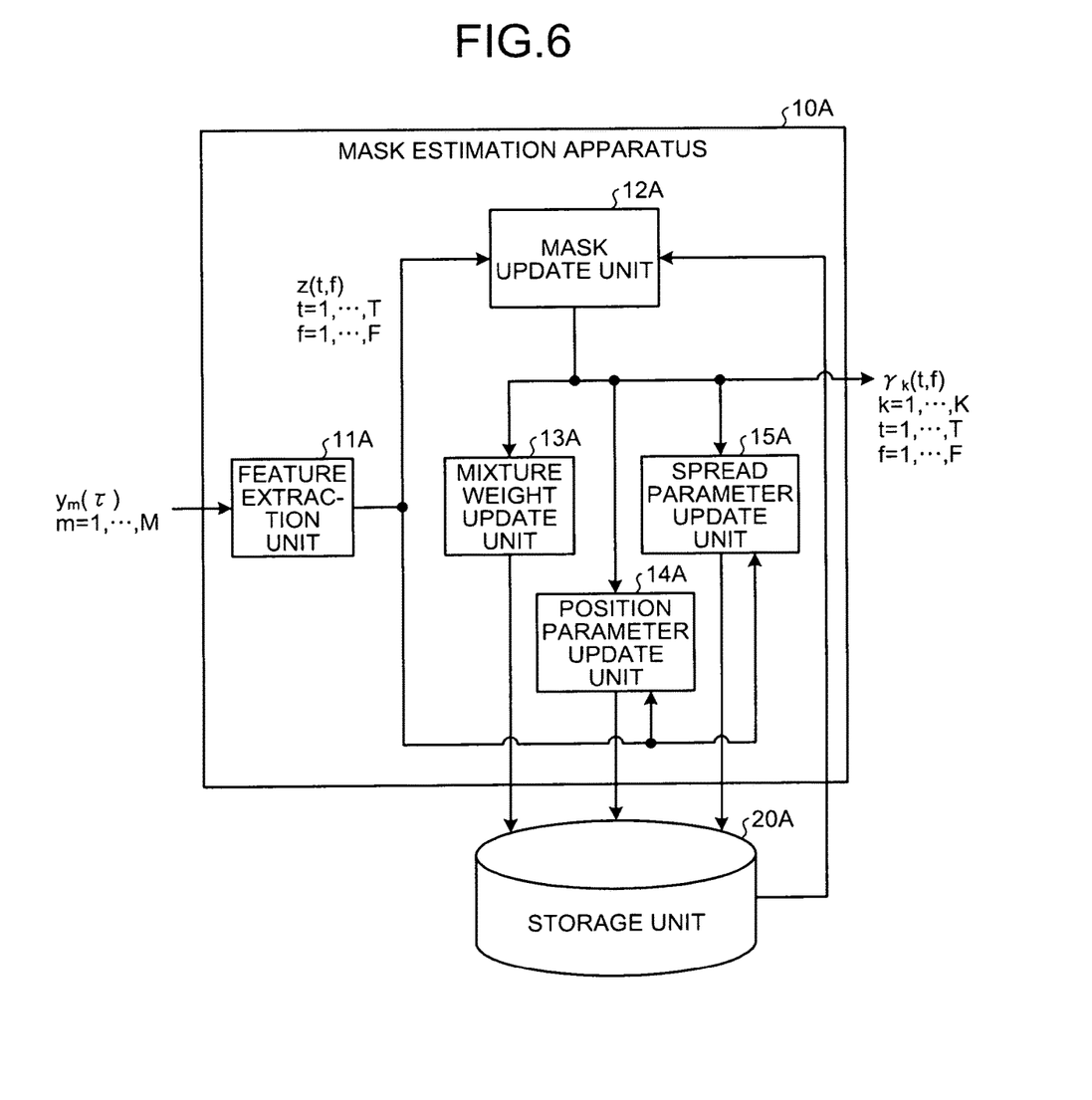
FIG. 6 is a diagram illustrating an example of a mask estimation apparatus according to the background art.

FIG. 6 is a diagram illustrating an example of a mask estimation apparatus according to the background art. A mask estimation apparatus 10A according to the background art is connected with a storage unit 20A. The mask estimation apparatus 10A includes a feature extraction unit 11A, a mask update unit 12A, a mixture weight update unit 1311, a position parameter update unit 14A, and a spread parameter update unit 15A.

As described later, the storage unit 20A stores therein a mixture weight for each component distribution, a position parameter indicating the position of each component distribution, and a spread parameter indicating the spread of each component distribution, where the probability distribution of feature vectors extracted by the feature extraction unit 11A is modeled by a mixture distribution consisting of a plurality of component distributions.

The feature extraction unit 11A receives M (M>1) observation signals recorded at different positions in a situation where N (N>1) acoustic signals are mixed, makes an M-dimensional column vector obtained by collecting the time-frequency components of all observation signals for each time-frequency point, and uses the M-dimensional column vector to extract an M-dimensional feature vector having a predetermined norm.

The mask update unit 12A receives the feature vectors extracted by the feature extraction unit 11A from the feature extraction unit 11A, receives the mixture weight, the position parameter, and the spread parameter stored in the storage unit 20A from the storage unit 20A, and updates masks indicating the proportion in which each component distribution contributes to each time-frequency point.

The mixture weight update unit 13A receives the masks updated by the mask update unit 12A, and updates the mixture weight. The position parameter update unit 14A receives the feature vectors extracted by the feature extraction unit 11A and the masks updated by the mask update unit 12A, and updates the position parameter. The spread parameter update unit 15A receives the feature vectors extracted by the feature extraction unit 11A and the masks updated by the mask update unit 12A, and updates the spread parameter.

The above Literature 1 assumes that the number N of acoustic signals is already known and that N-1 thereof are desired sounds and one thereof is background noise. The case N=2 corresponds to the case where speech of a person is recorded by M microphones under the presence of background noise, for example. Furthermore, the case N>2 corresponds to the case where a conversation by N−1 persons is recorded by M microphones under the presence of background noise, for example.

Now, an M-dimensional column vector (hereinafter referred to as an "observation signal vector") obtained by collecting, for each time-frequency point, time-frequency components of observation signals obtained by applying time-frequency analysis such as the short-time Fourier transform to M observation signals is represented by y(t,f). t (t=1, . . . T. t is a positive integer.) represents time, and f (f=1, . . . F. f is a positive integer.) represents a frequency-bin index.

In the above Literature 1, it is assumed that desired sounds have sparsity and only one desired sound at most is present at each time-frequency point, and it is assumed that background noise is present at all time-frequency points. In this case, an observation signal vector y(t,f) takes one of the following N states at each time-frequency point.

State $S_n$: the state where only the n-th out of the desired sounds is present (n=1, . . . , N−1. n is a positive integer.).

State $S_N$: the state where no desired sound is present.

Thus, it is assumed that the observation signal vector y(t,f) can be modeled by either of the following expressions (1-1) and (1-2).

$$y(t,f)=s_n(t,f)+v(t,f) \quad (1\text{-}1)$$

$$y(t,f)=v(t,f) \quad (1\text{-}2)$$

The above expression (1-1) represents the case where only the n-th of the desired sounds is present at the time-frequency point, and the above expression (1-2) represents the case where none of the desired sounds is present at the time-frequency point. The vector $s_n(t,f)$ in the above expressions (1-1) and (1-2) represents a component corresponding to the n-th desired sound, and the vector v(t,f) represents a component corresponding to background noise.

The object of the mask estimation apparatus 10A is to estimate masks $\gamma_n(t,f)$ indicating the proportion in which each state $S_n$ (n=1, . . . , N) contributes to each time-frequency point (t,f) when the observation signal vector y(t,f) is given. The masks $\gamma_n(t,f)$ satisfy $\gamma_1(t,f)+ \ldots +\gamma_N(t,f)=1$ and $0 \leq \gamma_n(t,f) \leq 1$. For example, the mask $\gamma_n(t,f)$ can be defined as $\gamma_n(t,f)=1$ when the state at the time-frequency point is $S_n$, and otherwise can be defined as $\gamma_n(t,f)=0$. Alternatively, more generally, the mask $\gamma_n(t,f)$ can be defined as the posterior probability of the state $S_n$ at the time-frequency point. In the following description, the mask $\gamma_n(t,f)$ is defined as the posterior probability of the state $S_n$ at the time-frequency point.

Once the masks $\gamma_n(t,f)$ can be estimated, they can be used for various applications, such as the estimation of each desired sound $s_n(t,f)$. For example, by using the masks $\gamma_n(t,f)$ to collect the time-frequency components where the desired sound is present, statistics representing characteristics of the desired sound can be estimated. Each desired sound $s_n(t,f)$ can be estimated by a filter designed by using the statistics.

In the above Literature 1, attention is paid to the fact that the directions of arrival of acoustic signals are different from one another, and the masks $\gamma_n(t,f)$ are estimated by clustering the directions of arrival. The feature extraction unit 11A extracts a feature vector representing information as to from which direction the sound arrives at each time-frequency point. The length (norm) of an observation signal vector y(t,f) depends on an acoustic signal itself, but it is assumed that the direction of the observation signal vector y(t,f) is determined by only the position of its sound source. Based on this assumption, an M-dimensional feature vector z(t,f) having a given norm is extracted from the observation signal vector y(t,f) as a feature vector representing the sound source position. For example, the feature vector z(t,f) can be extracted by the following expression (2).

$$z(t, f) = \frac{y(t, f)}{\|y(t, f)\|} \quad (2)$$

Here, $\|\bullet\|$ represents the 2-norm. The direction of arrival of sound is different depending on which of the states $S_n$ the time-frequency point takes. Thus, the feature vector z(t,f) has a different probability distribution for each state $S_n$.

In view of the above, by applying the clustering technology to the feature vector z(t,f), masks indicating the proportion in which each state contributes to each time-frequency point can be estimated. This is the basic concept in the above Literature 1.

In the above Literature 1, the probability distribution of the feature vector z(t,f) is modeled by a mixture distribution in the following expression (3) for each frequency.

$$p(z(t,f); \Theta) = \sum_{k=1}^{K} \alpha_k(f) p_w(z(t,f); a_k(f), \sigma_k^2(f)) \quad (3)$$

Clustering is performed by estimating model parameters (set) $\Theta$ so that the mixture distribution in the above expression (3) approximates to the distribution of the feature vector z(t,f). Each component distribution of the mixture distribution in the above expression (3) is represented by the following expression (4).

$$p_w(z; a, \sigma^2) \propto \exp\left(-\frac{\|z - (a^H z)a\|^2}{\sigma^2}\right) \propto \exp\left(\frac{|a^H z|^2}{\sigma^2}\right) \quad (4)$$

The component distribution in the above expression (4) models the conditional probability distribution of the feature vector z(t,f) under the condition that the state is already known, and $\alpha_k(f)$ satisfying $\alpha_1(f)+ \ldots +\alpha_K(f)=1$ and $0 \leq \alpha_k(f) \leq 1$ is a mixture weight of the k-th component distribution. Furthermore, the position parameter (vector) $a_k(f)$ satisfying $\|a_k(f)\|=1$ represents the position of the k-th component distribution. Furthermore, the spread parameter $\sigma_k^2(f)$ represents the spread of the k-th component distribution. Note that K is the number of components, the model parameters (set) $\Theta$ represent a set $\{\alpha_k(f), a_k(f), \sigma_k^2(f)\}$ of the model parameters of the mixture distribution in the above expression (3), and $\cdot^H$ represents Hermitian transposition of a matrix. If we compare the component distribution $p_w(z(t,f); a_k(f), \sigma_k^2(f))$ in the above expression (3) to a mountain, the mixture weight $\alpha_k(f)$ as a model parameter of the mixture distribution in the above expression (3) corresponds to the height of the mountain, the position parameter $a_k(f)$ corresponds to the position of the mountain, and the spread parameter $\sigma_k^2(f)$ corresponds to the spread of the foot of the mountain. In the above Literature 1, the number K of components is equal to the number N of acoustic signals (assumed to be already known).

Once the model parameters $\Theta$ are determined, the posterior probability that the time-frequency point corresponds to the k-th component distribution under the condition that the feature vector z(t,f) is observed (that is, the mask) is obtained by the following expression (5) based on Bayes' theorem.

$$\gamma_k(t,f) = \frac{\alpha_k(f) p_w(z(t,f); a_k(f), \sigma_k^2(f))}{\sum_{l=1}^{K} \alpha_l(f) p_w(z(t,f); a_l(f), \sigma_l^2(f))} \quad (5)$$

Here, the question is how to estimate the model parameters $\Theta$. In the above Literature 1, the model parameters $\Theta$ and the masks $\gamma_k(t,f)$ are estimated by alternating two steps, namely a step of updating the masks $\gamma_k(t,f)$ by the above expression (5) using the model parameters $\Theta$ and a step of updating the model parameters $\Theta$ using the masks $\gamma_k(t,f)$. At the step of updating the model parameters $\Theta$, the masks $\gamma_k(t,f)$ are used to update the model parameters $\Theta$ by the following expressions (6-1) to (6-3).

$$\alpha_k(f) = \frac{1}{T} \sum_{t=1}^{T} \gamma_k(t,f) \quad (6\text{-}1)$$

$a_k(f)$=UNIT-NORM EIGENVECTOR CORRESPONDING TO MAXIMUM EIGENVALUE OF $R_k(f)$ (6-2)

$$\sigma_k^2(f) = \frac{\sum_{t=1}^{T} \gamma_k(t,f) \|z(t,f) - \{a_k^H(f) z(t,f)\} a_k(f)\|^2}{(M-1) \sum_{t=1}^{T} \gamma_k(t,f)} \quad (6\text{-}3)$$

Here, the matrix $R_k(f)$ is calculated by the following expression (7).

$$R_k(f) = \frac{\sum_{t=1}^{T} \gamma_k(t,f) z(t,f) z^H(t,f)}{\sum_{t=1}^{T} \gamma_k(t,f)} \quad (7)$$

The above-mentioned iterative processing can be theoretically derived as optimization of the log-likelihood by the expectation-maximization algorithm. Note that the above expression (5) corresponds to processing in which the mask update unit 12A updates the masks $\gamma_k(t,f)$, the above expression (6-1) corresponds to processing in which the mixture weight update unit 13A updates the mixture weight $\alpha_k(f)$, the above expression (6-2) corresponds to processing in which the position parameter update unit 14A updates the position parameter $a_k(f)$, and the above expression (6-3) corresponds to processing in which the spread parameter update unit 15A updates the spread parameter $\sigma_k^2(f)$.

Here, in the method in the above Literature 1, the masks are estimated by the above expression (5) based on the mixture distribution in the above expression (3), and hence the estimation accuracy of the masks is greatly affected by how accurately the mixture distribution in the above expression (3) can approximate to the distribution of the feature vectors z(t,f). In the method in Literature 1, in order that the mixture distribution in the above expression (3) approximates to the distribution of the feature vectors z(t,f), the position parameter $a_k(f)$ and the spread parameter $\sigma_k^2(f)$ in the mixture distribution in the above expression (3) are updated to adjust the position and the spread of the component distribution in the above expression (4). Thus, there is a restriction that the component distribution in the above expression (4) can represent only a shape of distribution that is rotationally symmetric about some axis.

The shape of distribution of the feature vectors z(t,f) is affected by various factors including the arrangement of microphones and acoustic transfer characteristics of a room, and is not always rotationally symmetric. Thus, in the method in the above Literature 1, the mixture distribution in the above expression (3) cannot always sufficiently approximate to the distribution of the feature vectors z(t,f), and the problem is that the accuracy of mask estimation by the above expression (5) is not high.

In view of the above, a mask estimation apparatus in a first aspect of the disclosed embodiments updates masks based on a mixture weight of each component distribution and a shape parameter that is a model parameter capable of controlling the shape of each component distribution, where the probability distribution of an M-dimensional feature vector based on M observation signals (M>1) recorded in a situation in which N (N>1) acoustic signals are mixed is modeled by a mixture distribution consisting of component distributions. The shape means the attributes of a figure except those representing its position and spread. Examples of the shape include information corresponding to the major axis and the minor axis of an ellipse.

With the mask estimation apparatus in the first aspect, the shape parameter is updated to adjust the shapes of the component distributions, and hence as compared with the method in the above Literature 1, the mixture distribution can approximate more accurately to the distribution of the feature vectors, and the masks can be estimated more accurately.

Furthermore, a mask estimation apparatus in a second aspect of the disclosed embodiments is configured so that, in the mask estimation apparatus in the first aspect, each component distribution is a complex Bingham distribution, where the probability distribution of the feature vectors is modeled by a mixture distribution consisting of component distributions, and the shape parameter is a parameter matrix of the complex Bingham distributions. In this case, a probability distribution $p(z(t,f);\Theta)$ of the feature vectors $z(t,f)$ is modeled by a mixture distribution (hereinafter referred to as "mixed complex Bingham distributions") represented by the following expression (8) in which the component distributions are complex Bingham distributions.

$$p(z(t, f); \Theta) = \sum_{k=1}^{K} \alpha_k(f) p_B(z(t, f); B_k(f)) \quad (8)$$

Note that $p_B(z;B)$ in the above expression (8) is a complex Bingham distribution defined by the following expression (9). Note that exp. represents an exponential function, $$p_B(z; B) = \frac{1}{c(B)} \exp(z^H B z) \quad (9)$$

In the above expression (9), the matrix B is a parameter matrix of the complex Bingham distribution, and c(B) is a normalization constant. The parameters $\Theta$ represent a set $\{\alpha_k(f), B_k(f)\}$ of model parameters of the mixed complex Bingham distributions in the above expression (8).

Note that the mixture weight $\alpha_k(f)$, which is a model parameter in the mixture distribution in the above expression (8), represents the height of the component distribution k, and the matrix $B_k(f)$ is a shape parameter capable of controlling the shape of distribution (such as distribution spreads in axial directions of an ellipse representing the shape of distribution) in addition to the position and the spread of the component distribution k. The first eigenvector of the matrix $B_k(f)$ represents the position of the component distribution k, the absolute value of the difference between the first eigenvalue and the second eigenvalue of the matrix $B_k(f)$ represents the smallness of spread of the component distribution k, and the absolute value of the difference between the first eigenvalue and the m-th eigenvalue (3≤m≤M) of the matrix $B_k(f)$ represents the smallness of a distribution spread in the (m−1)th axial direction of an ellipse representing the shape of distribution of the component distribution k.

Now, a special case where the parameter matrix B is represented by $B=(1/\sigma^2)\cdot aa^H$ by using only two parameters $\sigma^2$ and a (the case where a distribution spread in the first axial direction of the ellipse representing the shape of distribution, a distribution spread in the second axial direction, . . . , and a distribution spread in the (M−1)th axial direction are all equal) is considered. In this case, the complex Bingham distribution in the above expression (9) is represented by the following expression (10).

$$p_B(z; B) \propto \exp(z^H B z) = \exp\left(z^H \frac{1}{\sigma^2} a a^H z\right) = \exp\left(\frac{|a^H z|^2}{\sigma^2}\right) \quad (10)$$

The above expression (10) has the same shape as in the above expression (4), and is rotationally symmetric about the axis parallel to the vector a. On the other hand, in the complex Bingham distribution in the above expression (9), no special restrictions are imposed on the parameter matrix B, and by updating the parameter matrix B, the shape of distribution of the complex Bingham distribution in the above expression (9) can be adjusted to represent a shape of distribution that is not rotationally symmetric.

In this manner, the use of the complex Bingham distribution in the above expression (9) enables the mixture distribution in the above expression (8) to sufficiently approximate to the distribution of the feature vectors $z(t,f)$ even when the shape of distribution of the feature vectors $z(t,f)$ is not rotationally symmetric. Thus, the masks can be estimated more accurately than in the method described in the above Literature 1.

Under the modeling by the above expression (8), based on the expectation-maximization algorithm, an algorithm (described above) for estimating the masks $\gamma_k(t,f)$ and the model parameters $\Theta$ by alternating two steps, namely, a step of updating the masks $\gamma_k(t,f)$ using the model parameters $\Theta$ and a step of updating the model parameters $\Theta$ using the masks $\gamma_k(t,f)$, can be derived.

Furthermore, a mask estimation apparatus in a third aspect of the disclosed embodiments is configured so that, in the mask estimation apparatus in the first aspect, each component distribution is a complex angular central Gaussian (cACG) distribution, where the probability distribution of the feature vectors is modeled by a mixture distribution consisting of component distributions, and the shape parameter is a parameter matrix of the complex angular central Gaussian distribution.

In this case, the probability distribution $p(z(t,f);\Theta)$ of the feature vector $z(t,f)$ is modeled by a mixture distribution (hereinafter referred to as "mixed complex angular central Gaussian distributions") in the following expression (11) in which the component distributions are complex angular central Gaussian distributions.

$$p(z(t, f); \Theta) = \sum_{k=1}^{K} \alpha_k(f) p_A\left(z(t, f); \sum_k (f)\right) \quad (11)$$

Here, the $p_A(z;\Sigma)$ in the above expression (11) is a complex angular central Gaussian distribution defined by the following expression (12) in which the parameter matrix is a matrix $\Sigma$.

$$p_A(z; \Sigma) \propto \frac{1}{|\Sigma|} \left( z^H \Sigma^{-1} z \right)^{-M} \quad (12)$$

The matrix $\Sigma_k(f)$ is a shape parameter capable of controlling the shape of distribution (such as distribution spreads in axial directions of an ellipse representing the shape of distribution) in addition to the position and the spread of the component distribution k. The first eigenvector of the matrix $\Sigma_k(f)$ represents the position of the component distribution k, the ratio obtained by dividing the first eigenvalue of the matrix $\Sigma_k(f)$ by the second eigenvalue represents the smallness of the spread of the component distribution k, and the ratio obtained by dividing the first eigenvalue of the matrix $\Sigma_k(f)$ by the m-th eigenvalue ($3 \leq m \leq M$) represents the smallness of the distribution spread in the (m−1)th axial direction of an ellipse representing the shape of distribution of the component distribution k. The model parameters $\Theta$ represent a set $\{\alpha_k(f); \Sigma_k(f)\}$ of model parameters of the mixed complex angular central Gaussian distributions in the above expression (11).

Similarly to the complex Bingham distribution in the above expression (9) in the mask estimation apparatus in the second aspect described above, no special restrictions are imposed on the parameter matrix $\Sigma$ in the complex angular central Gaussian distribution in the above expression (12), and hence a shape of distribution that is not rotationally symmetric can be represented. Thus, the use of the complex angular central Gaussian distribution in the above expression (12) enables the shape of distribution to be modeled more accurately even when the shape of distribution of the feature vectors $z(t,f)$ is not rotationally symmetric, and hence the clustering can be performed more accurately than in the method in the above Literature 1.

First Embodiment

In the first embodiment, the complex Bingham distribution is used as a component distribution. In the first embodiment, similarly to the above Literature 1, it is assumed that the number N of acoustic signals is already known, and the mixture of N−1 desired sounds and one background noise is recorded by M microphones.

Mask Estimation Apparatus According to First Embodiment

Figure 1:
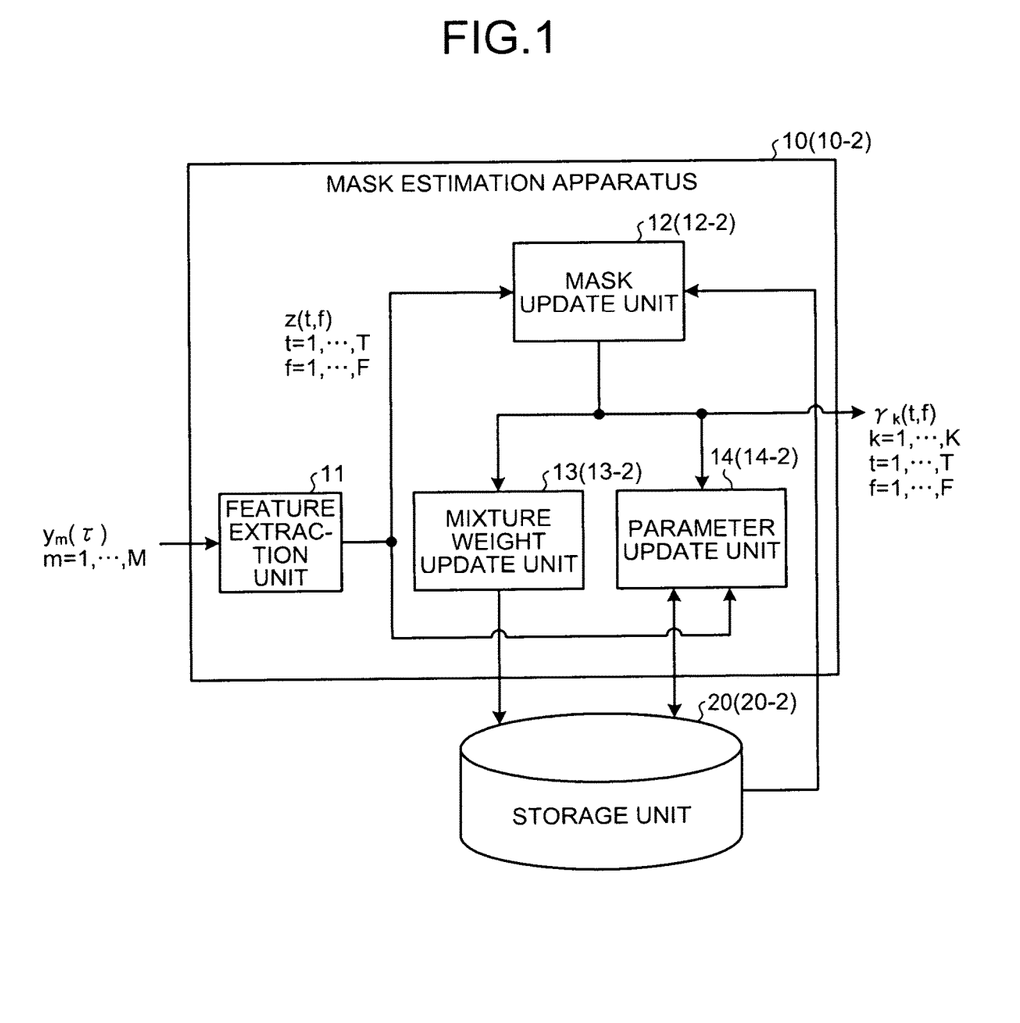
FIG. 1 is a diagram illustrating an example of a mask estimation apparatus according to a first embodiment (second embodiment).

FIG. 1 is a diagram illustrating an example of a mask estimation apparatus according to the first embodiment. A mask estimation apparatus 10 according to the first embodiment is connected with a storage unit 20. The mask estimation apparatus 10 includes a feature extraction unit 11, a mask update unit 12, a mixture weight update unit 13, and a parameter update unit 14. With τ being the number (sample number) representing time, an observation signal in a time domain recorded by a microphone m is denoted by $y_m(\tau)$. $y_m(\tau)$ can be modeled by the following expression (13) as the sum of the n-th desired source signal $s_{mn}(\tau)$ (n=1 to N−1, n is a positive integer) and background noise $v_m(\tau)$.

$$y_m(\tau) = \sum_{n=1}^{N-1} s_{mn}(\tau) + v_m(\tau) \quad (13)$$

The feature extraction unit 11 receives observation signals recorded by a plurality of microphones, and applies time-frequency analysis to each observation signal $y_m(\tau)$ to determine a time-frequency component $y_m(t,f)$ of each observation signal (m represents the microphone index and is an integer between 1 and M). Various methods such as the short-time Fourier transform and the short-time discrete cosine transform can be used as the time-frequency analysis.

Next, the feature extraction unit 11 configures an M-dimensional column vector (referred to as "observation signal vector") $y(t,f)$ represented by the following expression (14), which is obtained by collecting time-frequency components of all observation signals for each time-frequency point.

$$y(t, f) = \begin{bmatrix} y_1(t, f) \\ y_2(t, f) \\ \vdots \\ y_M(t, f) \end{bmatrix} \quad (14)$$

Next, the feature extraction unit 11 uses the observation signal vector $y(t,f)$ to extract an M-dimensional feature vector $z(t,f)$ having a predetermined norm. As the feature vector $z(t,f)$, various kinds of feature vectors such as the ones described in Literature 2 "H. Sawada, S. Araki, and S. Makino, "Underdetermined convolutive blind source separation via frequency bin-wise clustering and permutation alignment," IEEE Transactions on Audio, Speech and Language Processing (ASLP), vol. 19, no. 3, pp. 516-527, March 2011.", Literature 3 "D. H. Tran Vu and R. Haeb-Umbach, "Blind speech separation employing directional statistics in an expectation maximization framework," Proceedings of the International Conference on Acoustics, Speech and Signal Processing (ICASSP), pp. 241-244, March 2010.", and Literature 4 "S. Araki, H. Sawada, R. Mukai, and S. Makino, "Underdetermined blind sparse source separation for arbitrarily arranged multiple sensors," Signal Processing, vol. 87, no. 8, pp. 1833-1847, August 2007." can be used. For example, according to the above Literature 2, the feature vector $z(t,f)$ can be extracted by the following expression (15).

$$z(t, f) = \frac{y(t, f)}{\|y(t, f)\|} \quad (15)$$

Next, the mask update unit 12 receives the feature vector $z(t,f)$, and calculates and outputs masks $\gamma_k(t,f)$ indicating the proportion in which the k-th component distribution contributes to each time-frequency point (t,f).

Now, the flow of processing in the mask update unit 12 is described. First, the mask update unit 12 reads the initial values of model parameters $\Theta := \{\alpha_k(f), B_k(f)\}$, which are set and stored in the storage unit 20 in advance, flora the storage unit 20. The initial values of the model parameters $\Theta$ can be set by various methods, including the use of random numbers.

Next, the mask update unit 12 receives the feature vector $z(t,f)$ and the current estimated values of the model parameters $\Theta$, and updates masks corresponding to the k-th component distribution by the following expression (16), for example, as the posterior probability $\gamma_k(t,f)$.

$$\gamma_k(t,f) = \frac{\alpha_k(f)\frac{1}{c(B_k(f))}\exp(z^H(t,f)B_k(t,f)z(t,f))}{\sum_{l=1}^{K}\alpha_l(f)\frac{1}{c(B_l(f))}\exp(z^H(t,f)B_l(t,f)z(t,f))} \quad (16)$$

Given that the eigenvalues of the matrix $B_k(f)$ in the above expression (16) are $e_{k1}(f), \ldots,$ and $e_{kM}(f)$, the normalization constant $c(B_k(f))$ is determined by the following expression (17). Furthermore, the number K of components is K=N.

$$c(B_k(f)) = \sum_{m=1}^{M} \frac{\exp\{e_{km}(f)\}}{\prod_{l \neq m}\{e_{km}(f) - e_{kl}(f)\}} \quad (17)$$

Next, the mixture weight update unit 13 receives the posterior probability $\gamma_k(t,f)$, and updates the mixture weight by the following expression (18).

$$\alpha_k(f) = \frac{1}{T}\sum_{t=1}^{T}\gamma_k(t,f) \quad (18)$$

Next, the parameter update unit 14 receives the feature vector $z(t,f)$ and the posterior probability $\gamma_k(t,f)$, and calculates a positive definite Hermitian matrix $R_k(f)$ by the following expression (19).

$$R_k(f) = \frac{\sum_{t=1}^{T}\gamma_k(t,f)z(t,f)z^H(t,f)}{\sum_{t=1}^{T}\gamma_k(t,f)} \quad (19)$$

Next, the parameter update unit 14 performs eigenvalue decomposition of the matrix $R_k(f)$ as represented by the following expression (20).

$$R_k(f) = U_k(f)D_k(f)U_k^H(f) \quad (20)$$

According to the eigenvalue decomposition in the above expression (20), a unitary matrix $U_k(f)$ of eigenvectors of the matrix $R_k(f)$ and a diagonal matrix $D_k(f)$ of eigenvalues of the matrix $R_k(f)$ are determined. Here, the m-th diagonal component (eigenvalue) $d_{km}(f)$ of the matrix $D_k(f)$ is determined on the assumption that the diagonal components are arranged in ascending order of $d_{k1}(f) \leq \ldots \leq d_{kM}(f)$.

Next, the parameter update unit 14 updates the parameter matrix $B_k(f)$ with the following expression (21).

$$B_k(f) = U_k(f)E_k(f)U_k^H(f) \quad (21)$$

Here, the matrix $\Sigma_k(f)$ in the above expression (21) is a diagonal matrix in which the m-th diagonal component is $e_{km}(f)$. $e_{km}(f)$ is given by the following expression (22).

$$e_{km}(f) = \begin{cases} -\frac{1}{d_{km}(f)}, & m = 1, \ldots, M-1 \\ 0, & m = M \end{cases} \quad (22)$$

The processing in the mask update unit 12, the mixture weight update unit 13, and the parameter update unit 14 is repeatedly performed until the finish conditions are satisfied. As the finish conditions, various conditions such as the condition that "the processing is repeatedly performed for a predetermined number of times (for example, 20 times)" and the condition that "the increase amount of the log-likelihood function (described later) before and after update is equal to or smaller than a predetermined threshold" can be used.

Note that the storage unit 20 stores therein the mixture weight updated by the mixture weight update unit 13 and the shape parameter updated by the parameter update unit 14, and provides the stored mixture weight and shape parameter in the next processing in the mask update unit 12 and the parameter update unit 14.

Theoretical Background of Processing in Mask Estimation Apparatus 10

Now, the theoretical background of processing in the mask estimation apparatus 10 is described. The processing in the mask estimation apparatus 10 is derived by solving an optimization problem of maximizing a log-likelihood function $L(\Theta)$ in the following expression (23) with respect to model parameters $\Theta$.

$$L(\Theta) \triangleq \sum_{t=1}^{T}\sum_{f=1}^{F}\ln\sum_{k=1}^{K}\alpha_k(f)p_B(z(t,f);B_k(f)) \quad (23)$$

The log-likelihood function $L(\Theta)$ in the above expression (23) can be optimized by alternatingly repeating E Step and M Step described below based on the expectation-maximization algorithm.

From $\|z\|=1$, $p_B(z;B+hI) = p_B(z;B)$ (where I is a unit matrix) holds for any real number h, and hence in the following, it is assumed that the maximum eigenvalue $e_{kM}(f)$ of the matrix $B_k(f)$ is 0 without loss of generality. It means that the shape of distribution of the complex Bingham distribution is determined not by the value of each eigenvalue itself but by a difference between eigenvalues. Thus, even when a condition that the maximum eigenvalue is fixed to a designated value is added, the complex Bingham distribution remains unchanged as long as the difference between eigenvalues is maintained, and hence the maximum eigenvalue $e_{kM}(f)$ can be fixed to 0.

At E Step, the current estimated values of the model parameters $\Theta$ are used to update the posterior probability $\gamma_k(t,f)$ of the k-th component distribution by the following expression (24-2). Note that the normalization constant $c(.)$ is defined by the above expression (17).

$$\gamma_k(t,f) = \frac{\alpha_k(f)p_B(z(t,f);B_k(f))}{\sum_{l=1}^{K}\alpha_l(f)p_B(z(t,f);B_l(f))} \quad (24\text{-}1)$$

$$= \frac{\alpha_k(f)\frac{1}{c(B_k(f))}\exp(z^H(t,f)B_k(t,f)z(t,f))}{\sum_{l=1}^{K}\alpha_l(f)\frac{1}{c(B_l(f))}\exp(z^H(t,f)B_l(t,f)z(t,f))} \quad (24\text{-}2)$$

At M Step, the posterior probability $\gamma_k(t,f)$ updated at E Step is used to maximize a Q function defined by the following expressions (25-1) and (25-2), thereby updating the model parameters $\Theta$. Note that the matrix $R_k(f)$ is defined by the above expression (19), and tr represents the trace of the matrix.

$$Q(\Theta) = \sum_{t=1}^{T} \sum_{f=1}^{F} \sum_{k=1}^{K} \gamma_k(t,f) \ln\{\alpha_k(f) p_B(z(t,f); B_k(f))\} \quad (25\text{-}1)$$

$$= \sum_{t=1}^{T} \sum_{f=1}^{F} \sum_{k=1}^{K} \gamma_k(t,f) [\ln \alpha_k(f) - \ln c(B_k(f)) + tr\{B_k(f) R_k(f)\}] \quad (25\text{-}2)$$

Specifically, according to the method of Lagrange multipliers, $\alpha_k(f)$ that maximizes the function $Q(\Theta)$ under the constraint $\alpha_1(f) + \ldots + \alpha_K(f) = 1$ is obtained as represented by the above expression (18). In the following, an update rule for the shape parameter $B_k(f)$ of the complex Bingham distribution, which is a component distribution, is derived. Eigenvalue decomposition of the matrix $R_k(f)$ is defined by the following expression (26-1), and eigenvalue decomposition of the matrix $B_k(f)$ is defined by the following expression (26-2).

$$R_k(f) = U_k(f) D_k(f) U_k^H(f) \quad (26\text{-}1)$$

$$B_k(f) = V_k(f) \Sigma_k(f) V_k^H(f) \quad (26\text{-}2)$$

Here, the matrix $U_k(f)$ in the above expression (26-1) is a unitary matrix of eigenvectors of the matrix $R_k(f)$, and the matrix $V_k(f)$ in the above expression (26-2) is a unitary matrix of eigenvectors of the matrix $B_k(f)$. Furthermore, the matrix $D_k(f)$ in the above expression (26-1) is a diagonal matrix of eigenvalues of the matrix $R_k(f)$, and the matrix $E_k(f)$ in the above expression (26-2) is a diagonal matrix of eigenvalues of the matrix $B_k(f)$.

Then, given that the eigenvalues of the matrix $R_k(f)$ are $d_{k1}(f) \leq \ldots \leq d_{kM}(f)$ and the eigenvalues of the matrix $B(f)$ are $e_{k1}(f) \leq \ldots \leq e_{kM}(f) = 0$, the matrix $D_k(f)$ and the matrix $E_k(f)$ are represented by the following expressions (27-1) and (27-2), respectively. Note that the maximum eigenvalue $e_{kM}(f)$ of the matrix $B(f)$ is 0.

Note that, in the case where attention is paid to a certain sound source and a spatial correlation matrix $R_k(f)$ and a parameter matrix $B(f)$ of the complex Bingham distribution are subjected to eigenvalue decomposition to determine eigenvalues corresponding to the number of microphones, the m-th largest m-th eigenvalue (m=1 to M) has the following meaning. Specifically, the first eigenvector represents the position of a peak of the distribution of the sound $$D_k(f) \triangleq \begin{bmatrix} d_{k1}(f) & 0 & \ldots & 0 \\ 0 & d_{k2}(f) & \ldots & 0 \\ \vdots & \vdots & \ddots & \vdots \\ 0 & 0 & \ldots & d_{kM}(f) \end{bmatrix} \quad (27\text{-}1)$$

$$E_k(f) \triangleq \begin{bmatrix} e_{k1}(f) & 0 & \ldots & 0 \\ 0 & e_{k2}(f) & \ldots & 0 \\ \vdots & \vdots & \ddots & \vdots \\ 0 & 0 & \ldots & 0 \end{bmatrix} \quad (27\text{-}2)$$

Here, according to the result disclosed in Literature 5 "K. V. Mardia and P. E. Jupp, "Directional Statistics," John Wiley & Sons, West Sussex, 2000.", $V_k(f) = U_k(f)$ holds when the matrix $B_k(f)$ maximizes the function $Q(\Theta)$. Thus, when the partial differential of the function $Q(\Theta)$ for $e_{km}(f)$ (m=1, ..., M−1) is set to 0 by using the fact that the above expression (25-2) is deformed to the following expression (28), the following expression (29) is obtained.

$$tr\{B_k(f) R_k(f)\} = tr\{\Sigma_k(f) D_k(f)\} \quad (28)$$

$$\frac{\partial \ln c(B_k(f))}{\partial e_{km}(f)} = d_{km}(f), m = 1, \ldots, M-1 \quad (29)$$

To solve the above expression (29) for $e_{km}(f)$, it is assumed that the eigenvalues $d_{k1}(f), \ldots,$ and $d_{kM}(f)$ of the matrix $R(f)$ are all different. This assumption is almost always true for real data. In this case, a normalization constant $c(B_k(f))$ is given by the above expression (17).

Now, it is assumed that the complex Bingham distribution is sufficiently concentrated because acoustic signals arrive from particular directions. Given $e_{km}(f) = \kappa_k(f) e_{km0}(f)$ to take a limit $\kappa_k(f) \to \infty$, the normalization constant $c(B_k(f))$ can be approximated as represented by the following expressions (30-1) to (30-3).

$$c(B_k(f)) = \frac{1}{\kappa_k(f)^{M-1}} \left[ \frac{1}{\prod_{m=1}^{M-1} \{-e_{km0}(f)\}} + \sum_{m=1}^{M-1} \frac{\exp\{\kappa_k(f) e_{km0}(f)\}}{\prod_{l \neq m} \{e_{km0}(f) - e_{kl0}(f)\}} \right] \quad (30\text{-}1)$$

$$\sim \frac{1}{\kappa_k(f)^{M-1} \prod_{m=1}^{M-1} \{-e_{km0}(f)\}} \quad (30\text{-}2)$$

$$= \frac{1}{\prod_{m=1}^{M-1} \{-e_{km}(f)\}} \quad (30\text{-}3)$$

source of interest. Furthermore, the m-th eigenvector (m=2 to M) represents the direction of the (m−1)th axis of an ellipse representing the distribution of the sound source of interest (the m-th eigenvalue of the matrix $R_k(f)$ corresponds to the length of the axis).

Specifically, in the complex Bingham distribution, if attention is paid that "when sound is generated without the position of its sound source being greatly changed, the shape of distribution of feature vectors representing the sound source has a relatively steep peak (distribution is sufficiently concentrated)", the assumption that $\kappa_k(f)$ in the above expression (30-2) has an extremely large value can be introduced, and as a result, the normalization constant $c(B_k(f))$ can be represented in the form of the expression (30-3). Thus, the above expression (22) is obtained by solving the above expression (29) for $e_{km}(f)$.

Mask Estimation Processing According to First Embodiment

Figure 2:
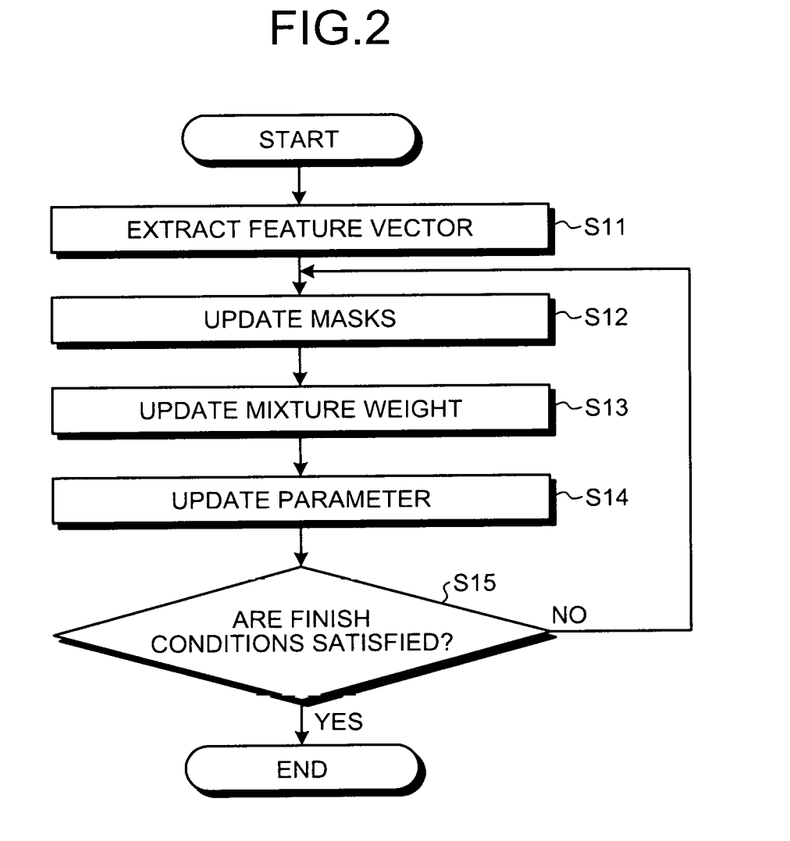
FIG. 2 is a flowchart illustrating an example of mask estimation processing according to the first embodiment (second embodiment).

FIG. 2 is a flowchart illustrating an example of mask estimation processing according to the first embodiment. As illustrated in FIG. 2, first, the feature extraction unit 11 extracts M-dimensional feature vector z(t,f) from observation signals recorded by microphones (Step S11).

Next, the mask update unit 12 calculates and updates masks $\gamma_k(t,f)$ based on the feature vector z(t,f), a mixture weight, and a shape parameter (Step S12). Next, the mixture weight update unit 13 updates the mixture weight based on a posterior probability $\gamma_k(t,f)$ (Step S13). Next, the parameter update unit 14 updates the parameter matrix based on the feature vector z(t,f) and the posterior probability $\gamma_k(t,f)$ (Step S14).

Next, the mask update unit 12 determines whether the finish conditions are satisfied (Step S15). When the finish conditions are satisfied (Yes at Step S15), the mask update unit 12 finishes the mask estimation processing. When the finish conditions are not satisfied (No at Step S15), the mask update unit 12 moves the processing to Step S12.

Second Embodiment

In the second embodiment, a complex angular central Gaussian distribution is used as a component distribution. In the first embodiment, similarly to the above Literature 1, it is assumed that the number N of acoustic signals is already known and sounds in which N−1 desired sounds and one background noise are mixed are recorded by M microphones.

Referring to FIG. 1, an example of a mask estimation apparatus 10-2 according to the second embodiment is described. The mask estimation apparatus 10-2 is connected with a storage unit 20-2. The mask estimation apparatus 10-2 includes a feature extraction unit 11, a mask update unit 12-2, a mixture weight update unit 13-2, and a parameter update unit 14-2.

The feature extraction unit 11 is similar to that in the first embodiment. The mask update unit 12-2 receives a feature vector z(t,f), calculates and outputs a mask $\gamma_k(t,f)$ indicating the proportion in which the k-th component distribution contributes to each time-frequency point (t,f).

Now, the flow of processing in the mask update unit 12-2 is described. First, the mask update unit 12-2 reads the initial values of the model parameters $\Theta := \{\alpha_k(f), \Sigma_k(f)\}$, which are set and stored in the storage unit 20-2 in advance, from the storage unit 20-2. The matrix $\Sigma_k(f)$ is a parameter matrix of complex angular central Gaussian distributions.

Next, the mask update unit 12-2 receives the feature vector z(t,f) and the current estimated values of the model parameters $\Theta$, and updates the mask corresponding to the k-th component distribution, for example, by the following expression (31) as the posterior probability $\gamma_k(t,f)$. Note that the number K of components is K=N.

$$\gamma_k(t,f) = \frac{\alpha_k(f) \frac{1}{|\Sigma_k(f)|} \frac{1}{\left\{z^H(t,f)\Sigma_k^{-1}(f)z(t,f)\right\}^M}}{\sum_{l=1}^{K} \alpha_l(f) \frac{1}{|\Sigma_l(f)|} \frac{1}{\left\{z^H(t,f)\Sigma_l^{-1}(f)z(t,f)\right\}^M}} \quad (31)$$

Next, the mixture weight update unit 13-2 receives the posterior probability $\gamma_k(t,f)$, and updates the mixture weight with the following expression (32).

$$\alpha_k(f) = \frac{1}{T} \sum_{t=1}^{T} \gamma_k(t,f) \quad (32)$$

Next, the parameter update unit 14-2 receives the feature vector z(t,f), the parameter matrix $\Sigma_k(t,f)$, and the posterior probability $\gamma_k(t,f)$, and updates the parameter matrix $\Sigma_k(t,f)$ with the following expression (33).

$$\sum_k(f) = M \frac{\sum_{t=1}^{T} \gamma_n(t,f) \frac{z(t,f)z^H(t,f)}{z^H(t,f)\Sigma_k^{-1}(f)z(t,f)}}{\sum_{t=1}^{T} \gamma_k(t,f)} \quad (33)$$

The processing in the mask update unit 12-2, the mixture weight update unit 13-2, and the parameter update unit 14-2 is repeatedly performed until the finish conditions are satisfied similarly to the first embodiment.

Note that the storage unit 20-2 stores therein the mixture weight updated by the mixture weight update unit 13-2 and the shape parameter updated by the parameter update unit 14-2, and provides the stored masks and shape parameter in the next processing in the mask update unit 12-2 and the parameter update unit 14-2.

Theoretical Background of Processing in Mask Estimation Apparatus 10-2

Now, the theoretical background of the processing by the mask estimation apparatus 10-2 is described. The processing in the mask estimation apparatus 10-2 is derived by solving an optimization problem of maximizing the log-likelihood function $L(\Theta)$ in the following expression (34) with respect to the model parameters $\Theta$.

$$L(\Theta) \triangleq \sum_{t=1}^{T} \sum_{f=1}^{F} \ln \sum_{k=1}^{K} \alpha_k(f) p_A\left(z(t,f); \sum_k(f)\right) \quad (34)$$

The log-likelihood function $L(\Theta)$ in the above expression (34) can be optimized by alternately repeating E Step and M Step described below based on the expectation-maximization algorithm.

At E Step, the current estimated values of the model parameters $\Theta$ are used to update the posterior probability $\gamma_k(t,f)$ of the k-th component distribution with the following expression (35-2).

$$\gamma_k(t, f) = \frac{\alpha_k(f) p_A\left(z(t, f); \sum_k(f)\right)}{\sum_{l=1}^{K} \alpha_l(f) p_A\left(z(t, f); \sum_l(f)\right)} \quad (35\text{-}1)$$

$$= \frac{\alpha_k(f) \frac{1}{\left|\sum_k(f)\right|} \frac{1}{\left\{z^H(t, f) \sum_k^{-1}(f) z(t, f)\right\}^M}}{\sum_{l=1}^{K} \alpha_l(f) \frac{1}{\left|\sum_l(f)\right|} \frac{1}{\left\{z^H(t, f) \sum_l^{-1}(f) z(t, f)\right\}^M}} \quad (35\text{-}2)$$

At M Step, the posterior probability $\gamma_k(t,f)$ updated at E Step is used to update the model parameters $\Theta$ by maximizing the Q function defined by the following expressions (36-1) and (36-2). Note that ln represents a logarithmic function.

$$Q(\Theta) = \sum_{t=1}^{T} \sum_{f=1}^{F} \sum_{k=1}^{K} \gamma_k(t, f) \ln\left\{\alpha_k(f) p_A\left(z(t, f); \sum_k(f)\right)\right\} \quad (36\text{-}1)$$

$$= \sum_{t=1}^{T} \sum_{f=1}^{F} \sum_{k=1}^{K} \gamma_k(t, f) \left[\ln \alpha_k(f) - \ln\left|\sum_k(f)\right| - M \ln\left\{z^H(t, f) \sum_k^{-1}(f) z(t, f)\right\}\right] \quad (36\text{-}2)$$

Specifically, according to the method of Lagrange multipliers, $\alpha_k(f)$ that maximizes the function $Q(\Theta)$ under a constraint $\alpha_1(f) + \ldots + \alpha_K(f) = 1$ is obtained as represented by the above expression (32). Furthermore, the partial differential for $\Sigma_k(f)$ of the function $Q(\Theta)$ is represented by the following expression (37).

$$-\left(\sum_{t=1}^{T} \gamma_k(t, f)\right) \sum_k^{-1}(f) + M \sum_{t=1}^{T} \gamma_k(t, f) \frac{\sum_k^{-1}(f) z(t, f) z^H(t, f) \sum_k^{-1}(f)}{z^H(t, f) \sum_k^{-1}(f) z(t, f)} \quad (37)$$

Then, when the partial differential for $\Sigma_k(f)$ of the function $Q(\Theta)$ represented by the above expression (37) is set to 0, the above expression (33) is obtained.

Note that the mask estimation processing according to the second embodiment is executed in accordance with the processing order in the flowchart representing an example of mask estimation processing illustrated in FIG. 2 similarly to the mask estimation processing according to the first embodiment.

Modification of First Embodiment and Second Embodiment

In the first embodiment and the second embodiment, N−1 of the N acoustic signals are desired sounds, and one of the N acoustic signals is background noise. However, without being limited thereto, in a modification of the first embodiment and the second embodiment, even when all of the N acoustic signals are desired sounds, masks corresponding to each acoustic signal (desired sound) can be estimated by the same processing.

Furthermore, in the first embodiment and the second embodiment, the parameters $\Theta$ are regarded as being definite, and the parameters $\Theta$ are estimated by the maximum-likelihood method. Without being limited thereto, however, in the modification of the first embodiment and the second embodiment, for example, the parameters $\Theta$ may be regarded as random variables to give a prior distribution, and the parameters $\Theta$ may be estimated by posterior probability maximization.

Third Embodiment

Figure 3:
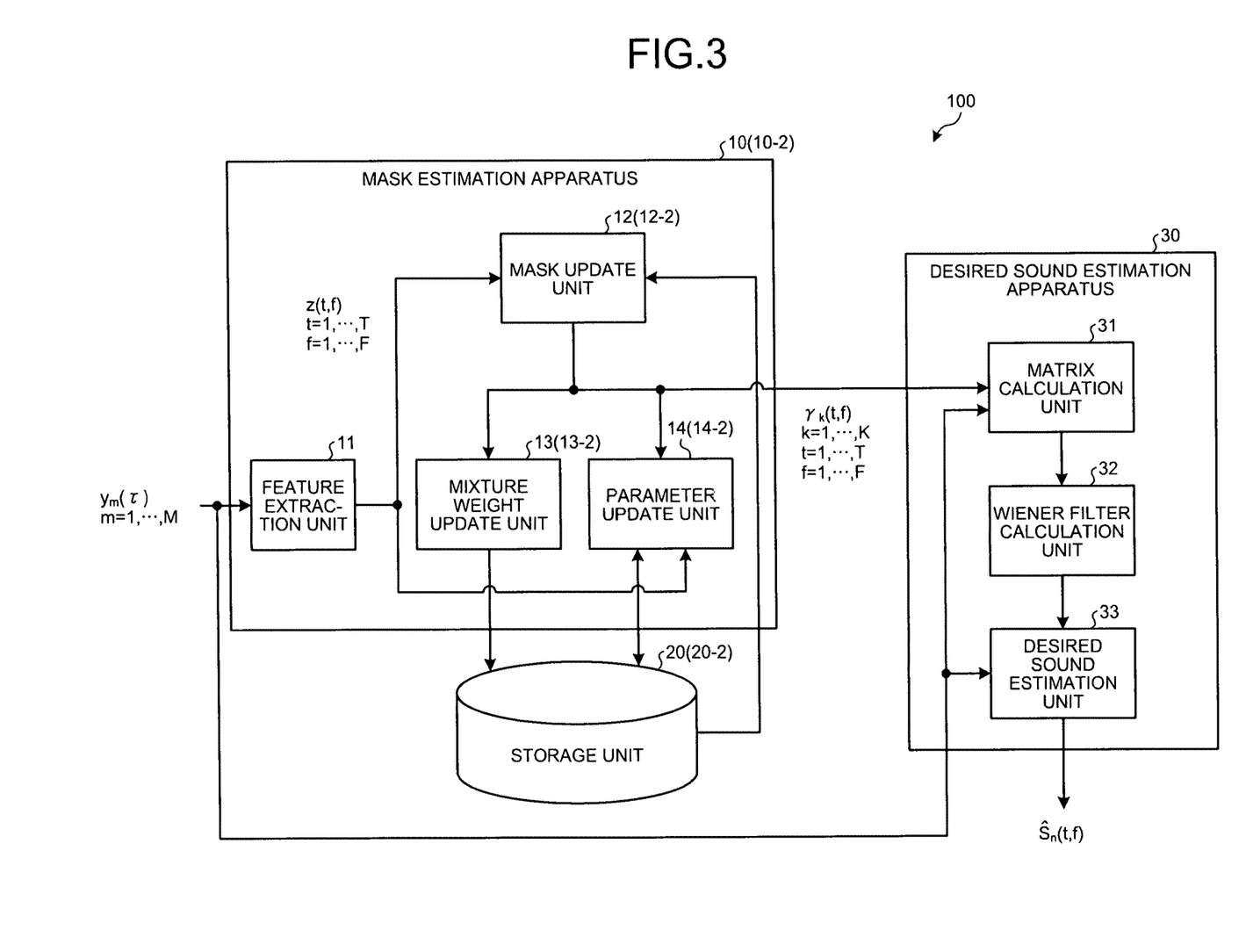
FIG. 3 is a diagram illustrating an example of a desired sound estimation system according to a third embodiment.

The third embodiment discloses a desired sound estimation system configured to estimate desired sound by using either the mask estimation apparatus 10 in the first embodiment or the mask estimation apparatus 10-2 in the second embodiment. FIG. 3 is a diagram illustrating an example of a desired sound estimation system according to the third embodiment.

A desired sound estimation system 100 according to the third embodiment includes either the mask estimation apparatus 10 in the first embodiment or the mask estimation apparatus 10-2 in the second embodiment, and a desired sound estimation apparatus 30. The desired sound estimation apparatus 30 inputs an observation signal vector y(t,f) and masks $\gamma_k(t,f)$ from the mask estimation apparatus 10 or the mask estimation apparatus 10-2, and outputs an estimated value $\hat{s}_n(t,f)$ (n=1 to N−1) of the n-th desired sound.

The desired sound estimation apparatus 30 includes a matrix calculation unit 31, a Wiener filter calculating unit 32, and a desired sound estimation unit 33.

In the third embodiment, masks are determined for each frequency f, and hence a cluster corresponding to acoustic signals having the same index n may have a different cluster index when the frequency f is different. This problem is called a permutation problem. Due to the permutation problem, in order to estimate each desired sound by using the masks $\gamma_k(t,f)$ determined in the first embodiment or the second embodiment, measures are taken such that a cluster corresponding to acoustic signals having the same index n has the same cluster index irrespective of the frequency f. This is called permutation alignment. The permutation alignment can be achieved by various methods, such as the method described in the above Literature 2 "H. Sawada, S. Araki, and S. Makino, "Underdetermined convolutive blind source separation via frequency bin-wise clustering and permutation alignment," IEEE Transactions on Audio, Speech and Language Processing (ASLP), vol. 19, no. 3, pp. 516-527, March 2011."

Now, a mask after the permutation alignment corresponding to the n-th acoustic signal is denoted by $\gamma_n(t,f)$ again. Furthermore, it is assumed that which of the N masks $\gamma_n(t,f)$ corresponds to background noise is already known. For example, separated sounds created by masking using the masks are compared by hearing, so that a cluster corresponding to background noise can be identified artificially.

In the following, it is assumed that a cluster corresponding to background noise is the N-th cluster without loss of generality. The matrix calculation unit 31 calculates a desired sound covariance matrix $\Phi_{n+v}(f)$ with noise for each desired sound n (n=1, ..., N-1) by the following expression (38).

$$\Phi_{n+v}(f) = \frac{\sum_{t=1}^{T} \gamma_n(t, f) y(t, f) y^H(t, f)}{\sum_{t=1}^{T} \gamma_n(t, f)} \quad (38)$$

Next, the matrix calculation unit 31 calculates a noise covariance matrix $\Phi_v(f)$ by the following expression (39).

$$\Phi_v(f) = \frac{\sum_{t=1}^{T} \gamma_N(t, f) y(t, f) y^H(t, f)}{\sum_{t=1}^{T} \gamma_N(t, f)} \quad (39)$$

Next, the matrix calculation unit 31 determines a desired sound covariance matrix $\Phi_n(f)$ for each desired sound n (n=1, ..., N-1) by the following expression (40).

$$\Phi_n(f) = \Phi_{n+v}(f) - \Phi_v(f) \quad (40)$$

Next, the matrix calculation unit 31 determines an observation covariance matrix $\Phi_y(f)$ by the following expression (41).

$$\Phi_y(f) = \frac{1}{T}\sum_{t=1}^{T} y(t, f) y(t, f) \quad (41)$$

Next, the Wiener filter calculation unit 32 calculates a multichannel Wiener filter $W_n(f)$ for each desired sound n (n=1, ..., N-1) by the following expression (42).

$$W_n(f) = \Phi_y^{-1}(f)\Phi_n(f) \quad (42)$$

Then, the desired sound estimation unit 33 applies the multichannel Wiener filter $W_n(f)$ to the observation signal vector y(t,f) as represented by the following expression (43), so that background noise and components of desired sounds other than the n-th desired sound can be suppressed to obtain an estimated value $\hat{s}_n(t,f)$ of the component of the desired sound n.

$$\hat{s}_n(t,f) = W_n^H(f) y(t,f) \quad (43)$$

Desired Sound Estimation Processing According to the Third Embodiment

Figure 4:
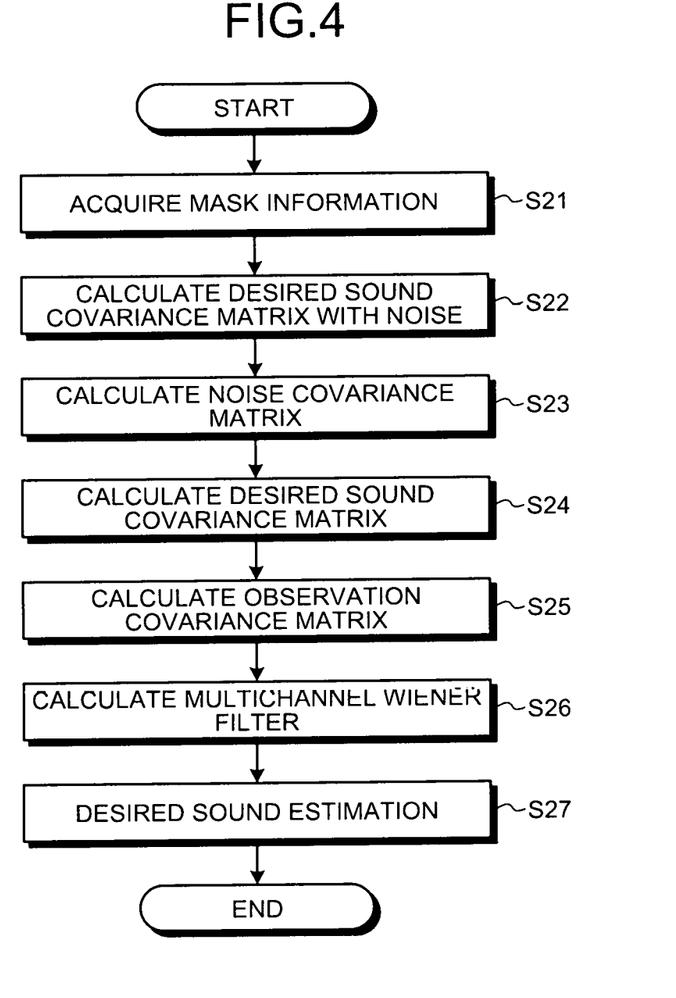
FIG. 4 is a flowchart illustrating an example of desired sound estimation processing according to the third embodiment.

FIG. 4 is a flowchart illustrating an example of desired sound estimation processing according to the third embodiment. First, the matrix calculation unit 31 in the desired sound estimation apparatus 30 acquires mask information from the mask estimation apparatus 10 (10-2) (Step S21).

Next, the matrix calculation unit 31 calculates a desired sound covariance matrix $\Phi_{n+v}(f)$ with noise (Step S22). Next, the matrix calculation unit 31 calculates a noise covariance matrix $\Phi_v(f)$ (Step S23). Next, the matrix calculation unit 31 calculates a desired sound covariance matrix $\Phi_n(f)$ (Step S24). Next, the matrix calculation unit 31 calculates an observation covariance matrix $\Phi_y(f)$ (Step S25).

Next, the Wiener filter calculation unit 32 calculates a multichannel Wiener filter $W_n(f)$ (Step S26). Next, the desired sound estimation unit 33 applies the multichannel Wiener filter $W_n(f)$ calculated at Step S26 to the observation signal vector y(t,f) to obtain and output an estimated value $\hat{s}_n(t,f)$ of components of the desired sound n (Step S27).

Performance Demonstration Results

As performance demonstration in the third embodiment, the desired sound estimation system 100 including the mask estimation apparatus 10 in the first embodiment was used to perform speech recognition for signals recorded by M=6 microphones mounted to a tablet in a situation where one speaker reads sentences toward the tablet (N=2 in the first embodiment) under an environment where background noise is present such as in a bus and at a cafe. Speech recognition performance (word error rate) was as follows.

Specifically, the word error rate in the case where speech recognition was performed without mask estimation was 14.29(%). Furthermore, the word error rate in the case where speech recognition was performed in a manner that multichannel Wiener filtering was applied after masks were estimated by mixed complex Watson distributions was 9.51 (%). The word error rate in the case where multichannel Wiener filtering was applied after masks were estimated by mixed complex Bingham distributions in the desired sound estimation system 100 including the mask estimation apparatus 10 in the first embodiment was 8.53(%). From the above, it is understood that speech recognition performance in the third embodiment is improved as compared with the related art.

The whole or any part of each processing performed in the desired sound estimation system 100 including the mask estimation apparatus 10 (10-2) and the desired sound estimation apparatus 30 in the above-mentioned embodiments may be implemented by a processing device such as a central processing unit (CPU) and a computer program analyzed and executed by the processing device. Furthermore, each processing performed in the desired sound estimation system 100 including the mask estimation apparatus 10 (10-2) and the desired sound estimation apparatus 30 may be implemented as hardware by wired logic.

Furthermore, the whole or part of the processing described above to be automatically performed among the processing described in the embodiments may be manually performed. Alternatively, the whole or part of the processing described above to be manually performed among the processing described in the embodiments may be automatically performed by a publicly known method. Furthermore, each processing described above with reference to the flowchart in the embodiments may be performed with appropriate replacement of execution order and parallel execution as long as the final execution results are identical. In addition, the above-mentioned and illustrated processing procedure, control procedure, specific names, and information including various kinds of data and parameters can be changed as appropriate unless otherwise specified.

Computer Program

Figure 5:
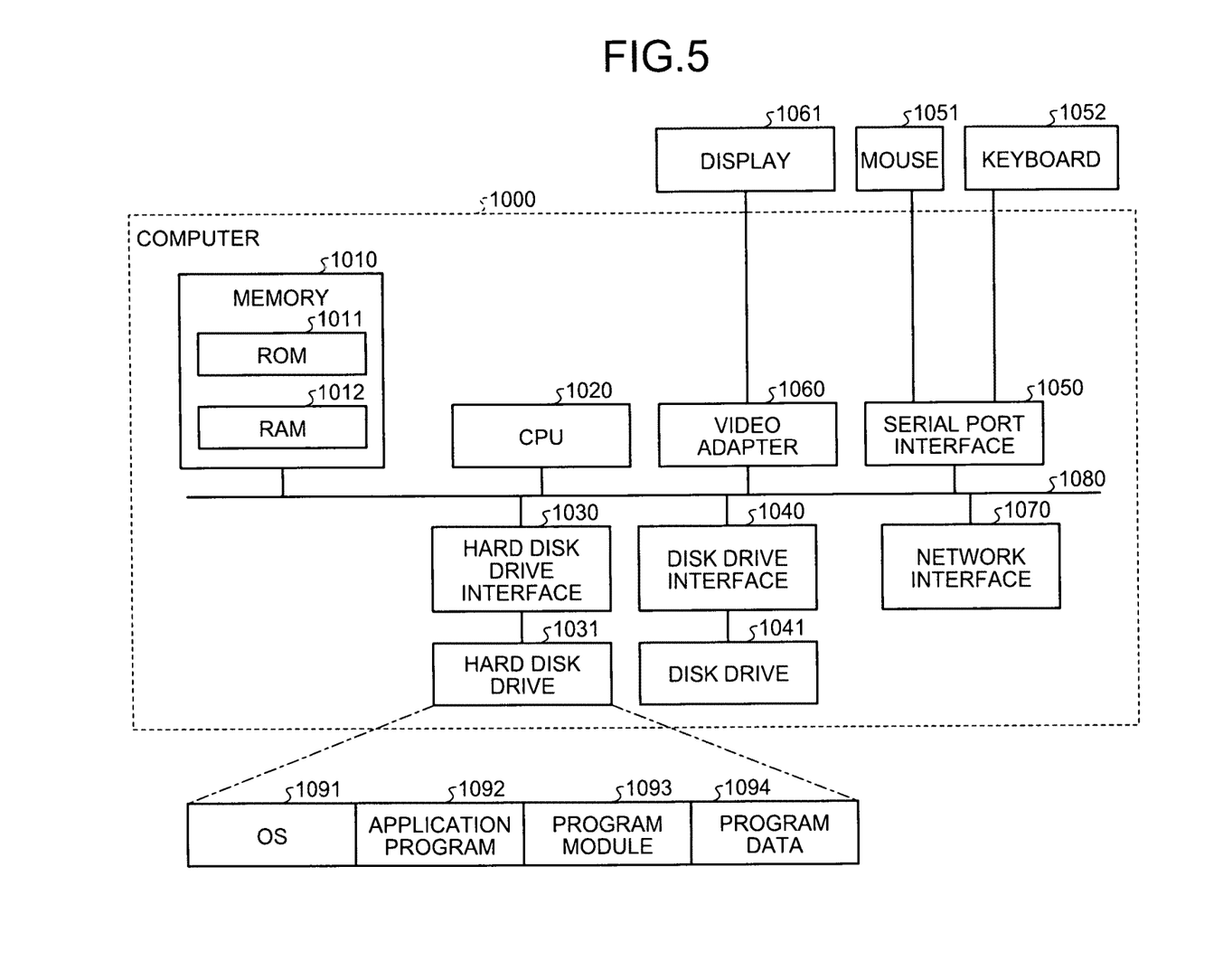
FIG. 5 is a diagram illustrating an example of a computer in which a desired sound estimation system including the mask estimation apparatus and the desired sound estimation apparatus according to the embodiments is implemented by executing a computer program.

FIG. 5 is a diagram illustrating an example of a computer in which a desired sound estimation system including the mask estimation apparatus and the desired sound estimation apparatus according to the embodiments is implemented by executing a computer program. A computer 1000 includes, for example, a memory 1010 and a CPU 1020. Furthermore, the computer 1000 includes a hard disk drive interface 1030, a disk drive interface 1040, a serial port interface 1050, a video adapter 1060, and a network interface 1070. In the computer 1000, these units are connected by a bus 1080.

The memory 1010 includes a ROM 1011 and a RAM 1012. For example, the ROM 1011 stores a boot program such as BIOS therein. The hard disk drive interface 1030 is connected to a hard disk drive 1031. The disk drive interface 1040 is connected to a disk drive 1041. For example, a removable storage medium such as a magnetic disk and an optical disc is inserted to a disk drive 1041. The serial port interface 1050 is connected to, for example, a mouse 1051 and a keyboard 1052. For example, the video adapter 1060 is connected to a display 1061.

For example, the hard disk drive 1031 stores an OS 1091, an application program 1092, a program module 1093, and program data 1094 therein. Specifically, a computer program that defines each processing of the mask estimation apparatus 10 (10-2) and the desired sound estimation apparatus 30 is stored in, for example, the hard disk drive 1031 as a program module 1093 in which a command executed by the computer 1000 is written. For example, a program module 1093 for executing information processing similarly to the functional configurations in the mask estimation apparatus 10 (10-2) and the desired sound estimation apparatus 30 is stored in the hard disk drive 1031.

Furthermore, setting data used in the processing in the embodiments is stored in, for example, the memory 1010 or the hard disk drive 1031 as program data 1094. Then, the CPU 1020 reads and executes the program module 1093 or the program data 1094 stored in the memory 1010 or the hard disk drive 1031 onto the RAM 1012 as necessary.

Note that the program module 1093 and the program data 1094 may be stored in, for example, a removable storage medium and read by the CPU 1020 through the disk drive 1041 without being limited to the case of being stored in the hard disk drive 1031. Alternatively, the program module 1093 and the program data 1094 may be stored in another computer connected through a network (such as local area network (LAN) and wide area network (WAN)). Then, the program module 1093 and the program data 1094 may be read by the CPU 1020 through the network interface 1070.

The embodiments are included in the technology disclosed herein and similarly included in the scope of the invention described in the claims and its equivalence.

REFERENCE SIGNS LIST 10, 10-2, 10A Mask estimation apparatus
11, 11A Feature extraction unit
12, 12-2, 12A Mask update unit
13, 13-2, 13A Mixture weight update unit
14, 14-2 Parameter update unit
14A Position parameter update unit
15A Spread parameter update unit
20, 20-2, 20A Storage unit
30 Desired sound estimation apparatus
31 Matrix calculation unit
32 Wiener filter calculation unit
33 Desired sound estimation unit
1000 Computer
1010 Memory
1020 CPU

The invention claimed is:

1. A mask estimation apparatus comprising: a memory; and a processor coupled to the memory and programmed to execute a process comprising:

extracting, from a plurality of observation signals acquired at different positions under a situation where a plurality of acoustic signals are mixed, feature vectors obtained by collecting time-frequency components of the observation signals for each time-frequency point;

storing in a storage a mixture weight of each component distribution and a shape parameter that is a model parameter capable of controlling a shape of each component distribution, where a probability distribution of the feature vectors is modeled by a mixture distribution consisting of a plurality of component distributions;

estimating and updating masks indicating, for each component distribution and each time-frequency point, a proportion in which each component distribution contributes to each time-frequency point by using the feature vectors, the mixture weight, and the shape parameter;

updating the mixture weight based on the masks updated by the updating masks; and updating the shape parameter by using the feature vectors and the masks, wherein probability density functions of the component distributions are capable of representing a probability density function that is not a function of an absolute value $|a^H z|$ of an inner product $a^H z$ of a and z, where z is an independent variable, a is a unit vector, and $\cdot^H$ is Hermitian transposition.

2. The mask estimation apparatus according to claim 1, wherein the component distributions are capable of representing a shape of distribution that is not rotationally symmetric.

3. The mask estimation apparatus according to claim 1, wherein probability density functions of the component distributions are functions of a quadratic form $z^H A z$, where z is an independent variable, A is a matrix, and $\cdot^H$ is Hermitian transposition, and the shape parameter is a parameter that determines the matrix A.

4. The mask estimation apparatus according to claim 1, wherein the shape parameter includes information on distribution spread in each axial direction of an ellipse representing a shape of distribution of each component distribution.

5. The mask estimation apparatus according to claim 1, wherein the component distributions are complex Bingham distributions, and the shape parameter is a parameter matrix of the complex Bingham distribution.

6. The mask estimation apparatus according to claim 1, wherein the component distributions are complex angular central Gaussian distributions, and the shape parameter is a parameter matrix of the complex angular central Gaussian distribution.

7. A mask estimation method executed by a mask estimation apparatus, the mask estimation apparatus comprising a storage to store therein a mixture weight of each component distribution and a shape parameter that is a model parameter capable of controlling a shape of each component distribution, where a probability distribution of feature vectors, which are extracted from a plurality of observation signals acquired at different positions under a situation where a plurality of acoustic signals are mixed, by collecting time-frequency components of the observation signals for each time-frequency point, is modeled by a mixture distribution consisting of a plurality of component distributions, the mask estimation method comprising:

a feature extraction step of extracting the feature vectors;

a mask update step of estimating and updating masks indicating, for each component distribution and each time-frequency point, a proportion in which each component distribution contributes to each time-frequency point by using the feature vectors, the mixture weight, and the shape parameter;

a mixture weight update step of updating the mixture weight based on the masks updated at the mask update step; and a parameter update step of updating the shape parameter by using the feature vectors and the masks, wherein probability density functions of the component distributions are capable of representing a probability density function that is not a function of an absolute value $|a^H z|$ of an inner product $a^H z$ of a and z, where z is an independent variable, a is a unit vector, and $\cdot^H$ is Hermitian transposition.

8. The mask estimation method according to claim 7, wherein the component distributions are capable of representing a shape of distribution that is not rotationally symmetric.

9. The mask estimation method according to claim 7, wherein probability density functions of the component distributions are functions of a quadratic form $z^H A z$, where z is an independent variable, A is a matrix, and $\cdot^H$ is Hermitian transposition, and the shape parameter is a parameter that determines the matrix A.

10. The mask estimation method according to claim 7, wherein the shape parameter includes information on distribution spread in each axial direction of an ellipse representing a shape of distribution of each component distribution.

11. A non-transitory computer-readable recording medium having stored a program for estimating masks that causes a computer to execute a process comprising:

extracting, from a plurality of observation signals acquired at different positions under a situation where a plurality of acoustic signals are mixed, feature vectors obtained by collecting time-frequency components of the observation signals for each time-frequency point;

storing in a storage a mixture weight of each component distribution and a shape parameter that is a model parameter capable of controlling a shape of each component distribution, where a probability distribution of the feature vectors is modeled by a mixture distribution consisting of a plurality of component distributions;

estimating and updating masks indicating, for each component distribution and each time-frequency point, a proportion in which each component distribution contributes to each time-frequency point by using the feature vectors, the mixture weight, and the shape parameter;

updating the mixture weight based on the masks updated by the updating masks; and updating the shape parameter by using the feature vectors and the masks, wherein probability density functions of the component distributions are capable of representing a probability density function that is not a function of an absolute value $|a^H z|$ of an inner product $a^H z$ of a and z, where z is an independent variable, a is a unit vector, and $\cdot^H$ is Hermitian transposition.

\* \* \* \* \*